US 9,750,389 B2

(12) United States Patent
Büsing et al.

(10) Patent No.: US 9,750,389 B2
(45) Date of Patent: Sep. 5, 2017

(54) DOMESTIC APPLIANCE HAVING AN EXTERNAL UPWARD EXTENDING PIPE

(71) Applicant: BSH Bosch und Siemens Hausgeräte GmbH, Munich (DE)

(72) Inventors: Johannes Büsing, Emersacker (DE); Helmut Jerg, Giengen (DE); Michael Georg Rosenbauer, Reimlingen (DE)

(73) Assignee: BSH Hausgeräte GmbH, Munich (DE)

( * ) Notice: Subject to any disclaimer, the term of this patent is extended or adjusted under 35 U.S.C. 154(b) by 170 days.

(21) Appl. No.: 14/398,979

(22) PCT Filed: May 8, 2013

(86) PCT No.: PCT/EP2013/059649
§ 371 (c)(1),
(2) Date: Nov. 5, 2014

(87) PCT Pub. No.: WO2013/171120
PCT Pub. Date: Nov. 21, 2013

(65) Prior Publication Data
US 2015/0115784 A1    Apr. 30, 2015

(51) Int. Cl.
*D06F 37/00* (2006.01)
*F16L 3/12* (2006.01)
(Continued)

(52) U.S. Cl.
CPC ....... *A47L 15/4223* (2013.01); *A47L 15/4246* (2013.01); *D06F 39/083* (2013.01);
(Continued)

(58) Field of Classification Search
CPC ............. A47L 15/4223; A47L 15/4246; D06F 39/083; F16L 3/04; F16L 5/00; Y10T 137/86348
(Continued)

(56) References Cited

U.S. PATENT DOCUMENTS 4,163,457 A * 8/1979 Rickel .................. D06F 39/083
137/216
4,870,988 A * 10/1989 Hood, Jr. .............. D06F 39/083
137/343
(Continued)

FOREIGN PATENT DOCUMENTS

DE            1769013 U       6/1958
DE          19629884 A1       1/1998
(Continued)

OTHER PUBLICATIONS

International Search Report PCT/EP2013/059649 dated Nov. 7, 2013.
Report of Examination CN 201380025882.0 dated May 5, 2016.

*Primary Examiner* — Tan Le
(74) *Attorney, Agent, or Firm* — Michael E. Tschupp; Andre Pallapies

(57) ABSTRACT

A water-conducting domestic appliance, in particular a domestic dishwasher, includes a first retaining device which is arranged on an outer wall and which is provided to hold a pipe on the outer wall when the domestic appliance is in operation. The outer wall has an aperture through which the hose is guided, with the first retaining device being arranged above the aperture.

14 Claims, 8 Drawing Sheets

(51) Int. Cl.
  *D06F 37/26*  (2006.01)
  *A47L 15/42*  (2006.01)
  *D06F 39/08*  (2006.01)
  *F16L 3/04*   (2006.01)
  *F16L 5/00*   (2006.01)

(52) U.S. Cl.
  CPC  *F16L 3/04* (2013.01); *F16L 5/00* (2013.01); *Y10T 137/86348* (2015.04)

(58) Field of Classification Search
  USPC ........ 137/343; 68/3 R; 248/74.2, 75, 79, 89, 248/90, 316.1, 316.7
  See application file for complete search history.

(56) References Cited

U.S. PATENT DOCUMENTS

| | | | |
|---|---|---|---|
| 8,459,064 B2* | 6/2013 | Haltmayer | A47L 15/4223 248/75 |
| 2015/0115784 A1* | 4/2015 | Busing | A47L 15/4223 312/228 |

FOREIGN PATENT DOCUMENTS

| | | | | |
|---|---|---|---|---|
| DE | 19907238 A1 * | 3/2000 | ........... | D06F 39/001 |
| DE | 19914370 A1 | 3/2000 | | |
| EP | 0937809 A1 * | 8/1999 | ........... | B65H 75/362 |
| EP | 2430965 A2 | 3/2012 | | |
| JP | 2003210378 A | 7/2003 | | |
| JP | 2004305730 A | 11/2004 | | |

* cited by examiner

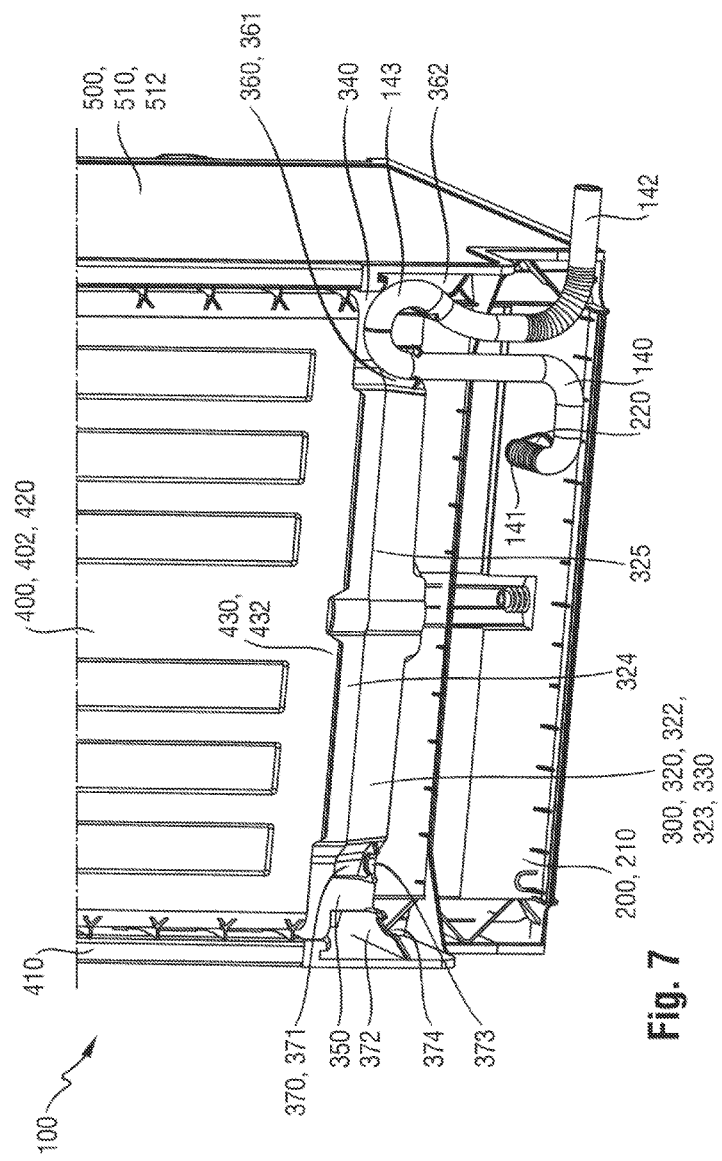

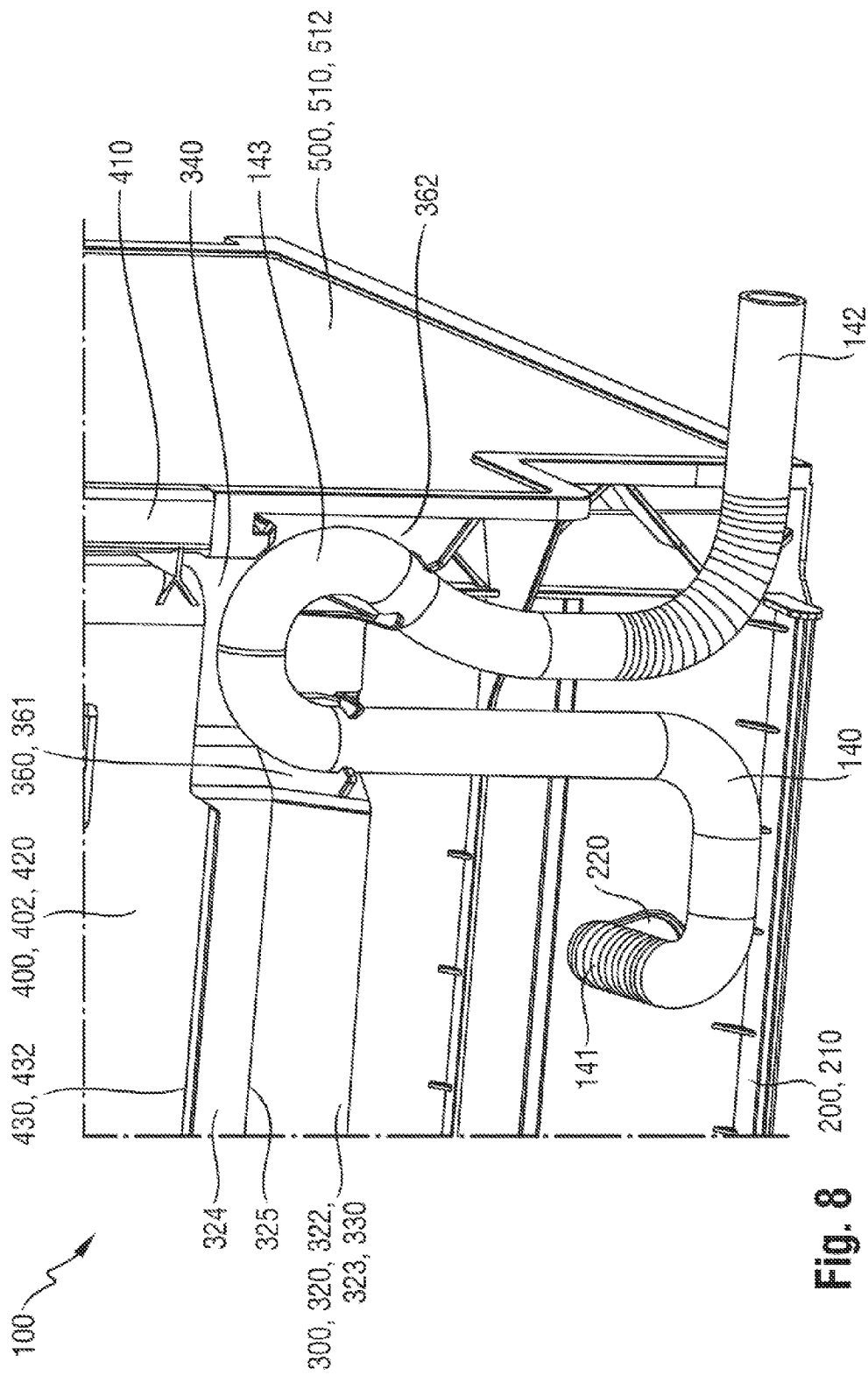

DOMESTIC APPLIANCE HAVING AN EXTERNAL UPWARD EXTENDING PIPE

BACKGROUND OF THE INVENTION

The invention relates to a water-conducting domestic appliance having a retaining device arranged on an outer wall.

Water-conducting domestic appliances, for example dishwashers, have drain hoses which are used to conduct waste water out of the domestic appliance. In order to prevent the water running out of the domestic appliance in an unintended and premature manner, it is known to provide an upward hose guide in the domestic appliance. With this the drain hose is guided above a position that is higher than the maximum fluid level of the water that occurs in the domestic appliance. DE 10 2008 020 884 A1 describes an upward hose guide, with which the drain hose is guided in a defined manner within the dishwasher by means of retaining clips.

BRIEF SUMMARY OF THE INVENTION

The object of the present invention is to provide a water-conducting domestic appliance, in which a path of a drain hose is improved. This object is achieved by a water-conducting domestic appliance having the features of claim 1. Preferred developments are set out in the dependent claims.

An inventive water-conducting domestic appliance, in particular a domestic dishwasher, has a first retaining device, which is arranged on an outer wall and is provided to hold a hose against the outer wall during operation of the domestic appliance. The hose itself can then advantageously be used to bring about an upward guide. This avoids the necessity for sealing points between the hose and an upward guide. This also advantageously simplifies the fitting of the water-conducting domestic appliance.

In one preferred embodiment of the domestic appliance the hose is guided through an aperture in the outer wall of the domestic appliance. The first retaining device here is arranged above the aperture. An upward hose guide then advantageously results, when the hose guided through the aperture is held against the outer wall by the retaining device.

In one embodiment of the domestic appliance the hose is a drain hose. The provision of an upward hose guide for a drain hose of a water-conducting domestic appliance is advantageously particularly expedient. One particular advantage of the retaining device for the hose being arranged on the outer wall is that the hose can be removed from the retaining device, for example during transportation. Also if a siphon is arranged sufficiently high up on a waste water connection in a domestic installation to dispense with an upward guide for the drain hose, the drain hose can be removed from the first retaining device. The usable length of the drain hose then advantageously increases, allowing the water-conducting domestic appliance to be positioned at a greater distance from the waste water connection.

In one preferred embodiment of the domestic appliance the outer wall is a rear outer wall of the domestic appliance. The hose is then advantageously hidden from view when the water-conducting domestic appliance is positioned in the usual manner. The concealed and therefore protected arrangement of the hose also reduces the risk of the hose being inadvertently damaged.

It is expedient for the first retaining device to be configured and arranged in such a manner that it can hold a segment of the hose running in a U shape. An upward hose guide for the hose can then advantageously be brought about in the form of a U-shaped segment of the hose.

In one preferred embodiment of the domestic appliance the first retaining device comprises a hose clip for clamping the hose. The hose can then advantageously be fitted on the first retaining device in a particularly simple manner and without additional tools.

The first retaining device particularly preferably comprises two hose clips. The hose is then advantageously held in a reliable manner by the retaining device.

In one preferred development of the domestic appliance the first retaining device is configured as a single piece with a base sump of the domestic appliance. The domestic appliance can then advantageously be produced at particularly low cost.

In one similarly preferred embodiment of the domestic appliance the first retaining device is configured as a single piece with a base support of the domestic appliance. The domestic appliance can then advantageously be produced at particularly low cost. The base support here can also be configured as a single piece with a base sump of the domestic appliance.

In one development of the domestic appliance the first retaining device is arranged in the region of a first recess of the outer wall, the outer wall being recessed in the direction of an internal chamber of the domestic appliance in the region of the first recess. The external measurements of the domestic appliance are then advantageously not increased by the first retaining device. A further advantage is that the upward hose guide for the hose can be arranged in the recess, with the result that the upward hose guide is protected at least partially from external influences and damage.

In one development of the domestic appliance the domestic appliance has a second retaining device, which is provided to hold the hose against the outer wall during operation of the domestic appliance. The hose can then advantageously be held either in the first retaining device or in the second retaining device. This advantageously increases the flexibility of the domestic appliance, allowing greater freedom of choice with regard to the installation site of the domestic appliance. The domestic appliance can then advantageously be installed in particular at both sides of a waste water connection.

In one particularly preferred embodiment of the domestic appliance the second retaining device is arranged in the region of a second recess of the outer wall, the outer wall being recessed in the direction of an internal chamber of the domestic appliance in the region of the second recess. An upward hose guide for the hose held in the second retaining device is then arranged in an at least partially protected manner in the second recess, thereby reducing the risk of inadvertent pulling off or damaging the upward hose guide. Also the second retaining device arranged in the second recess and the upward hose guide arranged in the second recess advantageously do not increase the external contour of the domestic appliance.

In one particularly preferred embodiment of the domestic appliance the second retaining device is configured and arranged with symmetry in relation to the first retaining device. In an advantageous manner the domestic appliance can then be used particularly flexibly and it offers great freedom of choice with regard to the installation site of the domestic appliance.

BRIEF DESCRIPTION OF THE DRAWINGS

Further features and advantages of the invention are described below based on exemplary embodiments with reference to the accompanying figures in which by means of schematic diagrams:

FIG. 7 shows a rear view of the dishwasher with the drain hose fitted; and

FIG. 8 shows an enlarged detail of part of the rear view of the dishwasher with the drain hose fitted.

DETAILED DESCRIPTION OF EXEMPLARY EMBODIMENTS OF THE PRESENT INVENTION

Figure 1:
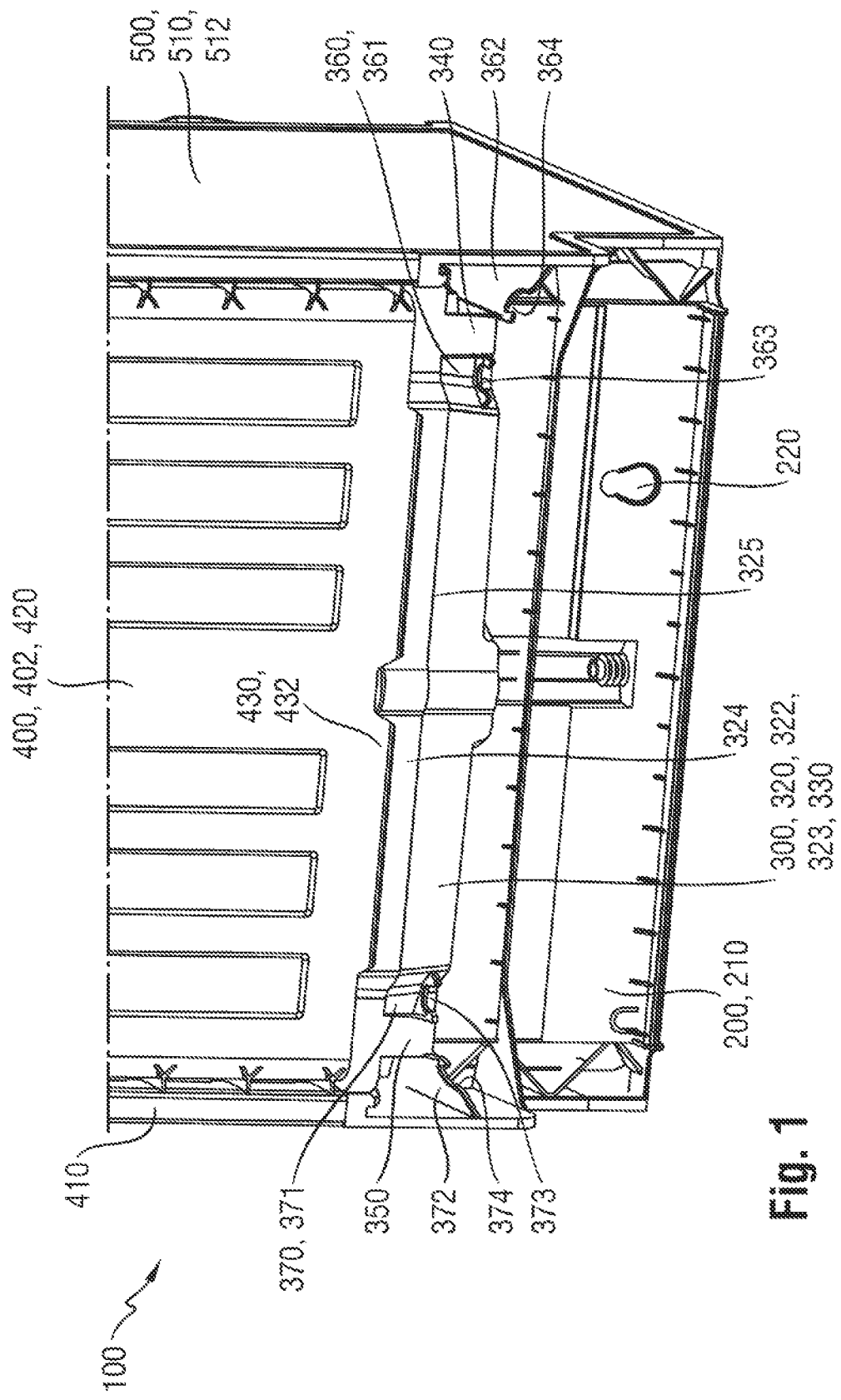
FIG. 1 shows part of a rear view of a dishwasher.

Identical elements or parts or those with identical effect are shown with the same reference characters in the figures. Only the components of the domestic appliance that are of significance for an understanding of the present invention are provided with reference characters and described. An inventive domestic appliance can of course also comprise other parts or assemblies.

The invention is described below with reference to a dishwasher 100. The dishwasher 100 is used to wash dishes. However the invention can also be used with other water-conducting domestic appliances. For example the invention can also be used with domestic washing machines.

FIG. 1 shows a perspective oblique view of part of a rear view of the dishwasher 100. It shows a rear wall 210 of a base support 200 of the dishwasher 100, an outer face 402 of a rear wall 400 of the dishwasher 100 and an outer face 512 of a first side wall 510 of a container wall 500 of the dishwasher 100. The base support 200 forms a floor and plinth region of the dishwasher 100. The rear wall 400 forms a rear face of the dishwasher 400 and comprises a frame 410, which is arranged on the base support 200 and serves to hold the container wall 500. The container wall 500 has a U shape and in addition to the first side wall 510 also forms a second side wall opposite the first side wall 510 and a top wall of the dishwasher 100. The base support 200 is preferably made of plastic. The rear wall 400 is preferably also made of plastic but can also be made of a metal. The container wall 500 is made of a metal or plastic.

The base support 200 of the dishwasher 100 comprises a base sump 300, of which only an outer face 322 of a rear segment 320 can be seen in FIG. 1. The base support 200 and base sump 300 are configured as a single piece in the dishwasher 100 but this is not necessarily required. In other embodiments of the invention the base support 200 and base sump 300 can also be configured separately.

The rear segment 320 of the part of the base support 200 forming the base sump 300 has a first recess 340, a center region 330 and a second recess 350 adjacent to one another over the width of the rear wall 210 of the base support 200, in other words in the region between the first side wall 510 of the dishwasher 100 and the second side wall of the dishwasher 100, which is opposite the first side wall 510. The first recess 340 here is adjacent to the first side wall 510 of the dishwasher 100. The second recess 350 is adjacent to the second side wall of the dishwasher 100. The center region 330 is arranged between the first recess 340 and the second recess 350.

In the region of the first recess 340 and the second recess 350 the rear segment 320 of the base sump 300 is offset further in the direction of an internal chamber of the dishwasher 100 than the center region 330. When looking down on the rear wall 210 the center region 330 therefore projects further out than the first recess 340 and the second recess 350. Corresponding transition regions are configured between the recesses 340, 350 and the center region 330.

The rear segment 320 of the part of the base support 200 forming the base sump 300 is divided into a lower segment 322 and an upper segment 324. The lower segment 323 is arranged below the upper segment 324 in the vertical direction of the dishwasher 100. The upper segment 324 is therefore arranged closer to a top wall of the dishwasher 100 than the lower segment 323. A small overhang 325 is configured between the lower segment 323 and the upper segment 324. This overhang 325 is formed in that the upper segment 324 is arranged somewhat further out than the lower segment 323. The lower segment 323 is therefore arranged closer to an internal chamber of the dishwasher 100.

An aperture 220 is configured in the rear wall 210 of the lower part of the base support 200, in other words the part of the base support 200 arranged below the base sump 300. The aperture 220 is therefore arranged below the base sump 300 and therefore also below the recesses 340, 350.

A first retaining device 360 is configured in the region of the first recess 340 of the rear segment 320 of the part of the base support 200 forming the base sump 300. A second retaining device 370 is configured in the region of the second recess 350 of the rear segment 320 of the base sump 300.

Figure 2:
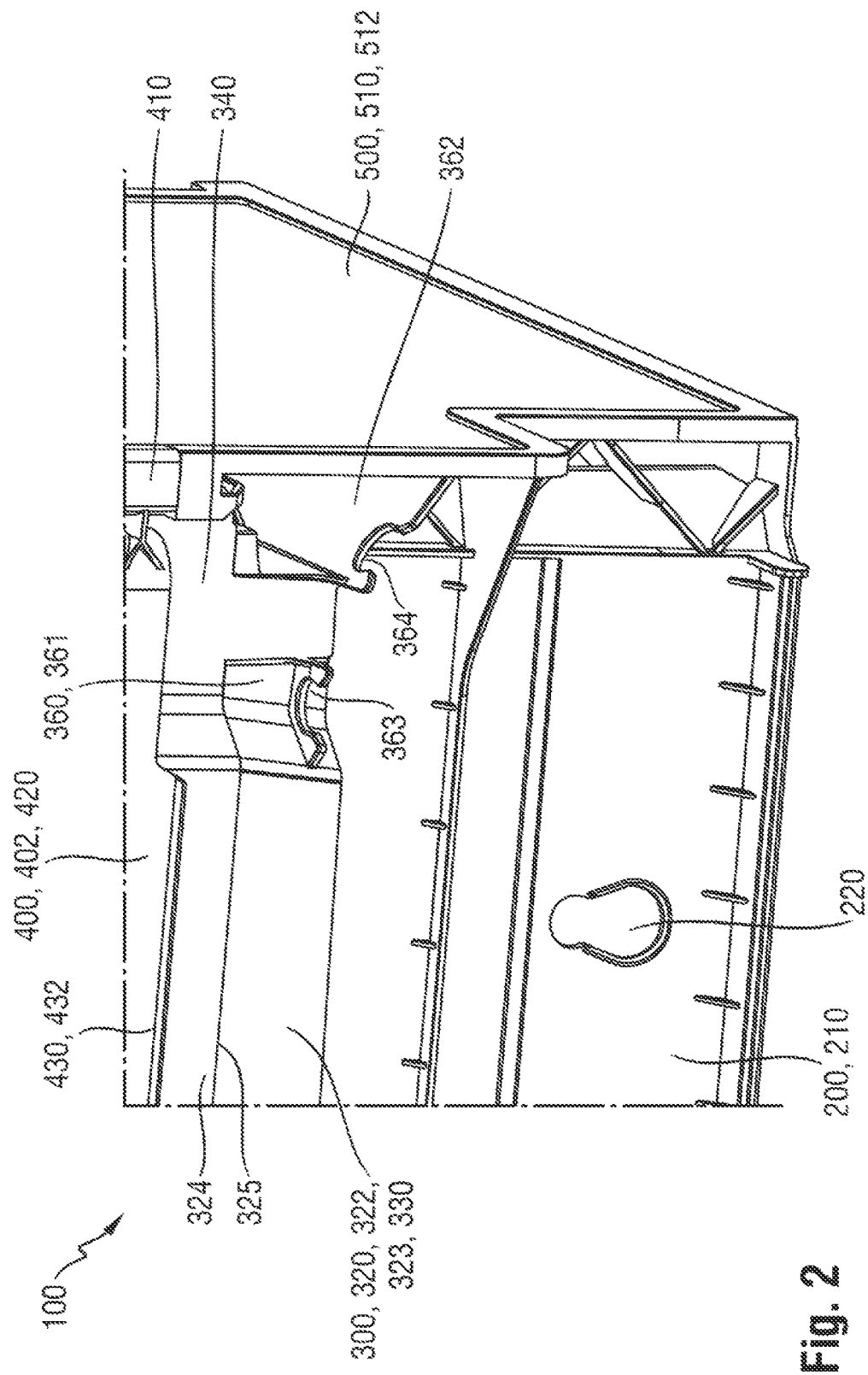
FIG. 2 shows an enlarged detail of the rear view of the dishwasher.

FIG. 2 shows an enlarged detail of part of the rear view of the dishwasher 100 shown in FIG. 1. FIG. 2 shows the region of the first recess 340 in the rear segment 320 of the base sump 300 and the first retaining device 360 arranged in the region of the first recess 340 in particular.

The first retaining device 360 comprises a first hose clip 361 and a second hose clip 362. The first hose clip 361 and the second hose clip 362 are preferably both configured as a single piece with the other parts of the base sump 300 and the remainder of the base support 200. The first hose clip 361 and the second hose clip 362 are each configured as flat components arranged essentially in one plane. The first hose clip 361 is connected to the base sump 300 in the region of the overhang 325 between the lower segment 323 and the upper segment 324 of the rear segment 320 of the base sump 300 and runs out at a downward angle. The plane in which the second hose clip 362 is arranged is tilted at an angle of around 45° to the plane in which the first hose clip 361 is arranged. The first hose clip 361 is arranged closer to the center region 330 of the rear segment 320 of the base sump 300. The first hose clip 361 is configured on the transition region between the first recess 340 of the rear segment 320 and the center region 330 of the rear segment 320 of the base sump 300. The second hose clip 362 is arranged closer to the first side wall 510 of the dishwasher 100. The tilt of the second hose clip 362 in relation to the first hose clip 361 is oriented in such a manner that the side of the second hose clip 362 facing the first hose clip 361 is higher than the side of the second hose clip 362 facing the first side wall 510 of the dishwasher 100 in the vertical direction of the dishwasher 100.

The first hose clip 361 and the second hose clip 362 extend respectively out from the inner region of the first recess 340. The first hose clip 361 and the second hose clip 362 here extend so far out from first recess 340 that the first hose clip 361 and the second hose clip 362 even project beyond the center region 330 of the rear segment 320 of the base sump 300 in the rearward direction of the dishwasher 100.

At its outer end the first hose clip 361 has a first clamping opening 363. The second hose clip 362 has a second clamping opening 364 at its outer end. The clamping openings 363, 364 are configured essentially in the shape of segments of a circle cut out of the flat hose clips 361, 362. The first clamping opening 363 and the second clamping opening 364 are shaped so that a hose of circular cross section can be clamped in the first clamping opening 363 and the second clamping opening 364.

It can be seen from FIG. 1 that the second retaining device 370, which is arranged in the region of the second recess 350, is configured with mirror symmetry in relation to the first retaining device 360 in the first recess 340. The second retaining device 370 therefore comprises a first hose clip 371 with a first clamping opening 373 and a second hose clip 372 with a second clamping opening 374. The first hose clip 371 is arranged in the transition region between the second recess 350 and the center region 330 of the rear segment 320 of the base sump 300 and is oriented parallel to the overhang 325 between the lower segment 323 and the upper segment 324 of the rear segment 320. The second hose clip 372 is adjacent to the second side wall of the dishwasher 100 and is tilted at an angle of around 45° to the first hose clip 371.

In one simplified embodiment of the dishwasher 100 either the first retaining device 360 or the second retaining device 370 can be dispensed with. The associated recess 340, 350 can then also be dispensed with.

Figure 3:
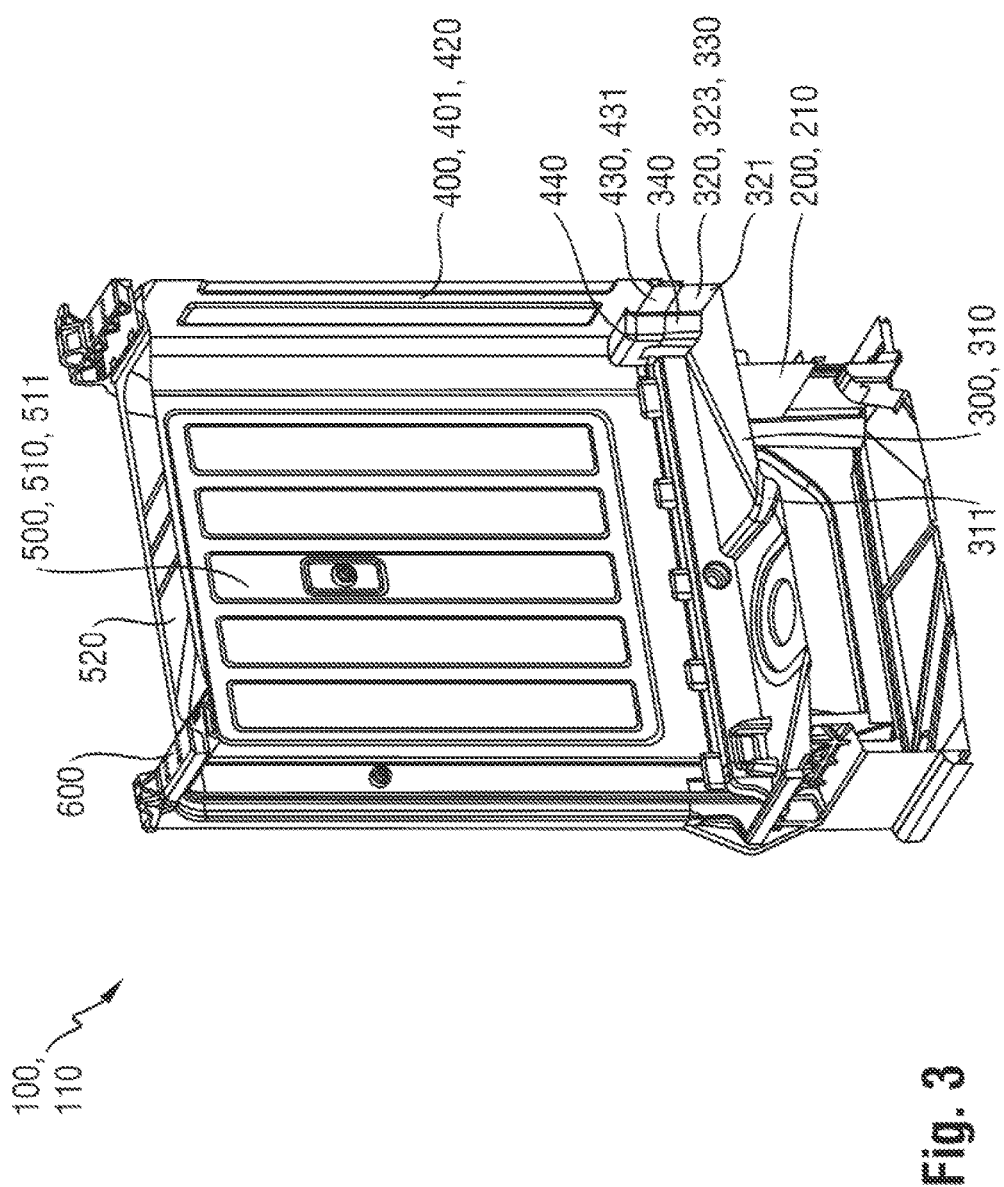
FIG. 3 shows a sectional view of an internal chamber of the dishwasher.

FIG. 3 shows a sectional diagram of a view of part of an internal chamber 110 of the dishwasher 100. The section here runs parallel to the first side wall 510 of the dishwasher 100.

It can be seen in FIG. 3 that the part of the base support 200 forming the base sump 300 forms a floor region 310 of the internal chamber 110 of the dishwasher 100. A number of stiffeners 311 configured as overhangs are configured in the floor region 310 of the base sump 300. The stiffeners 311 serve to increase the torsional rigidity of the floor region 310 of the base sump 300. The stiffeners 311 can also be dispensed with.

FIG. 3 shows that a front frame 600 is positioned on the base support 200, which forms a plinth of the dishwasher 100, in a front region of the dishwasher 100. Only part of the front frame 600 is shown in FIG. 3. The front frame 600 and the rear frame 410 configured as part of the rear wall 400 hold the U-shaped container wall 500, which comprises the first side wall 510, a top wall 520 and a second side wall. An inner face 511 of the first side wall 510 is visible in FIG. 3. Only part of the top wall 520 of the container wall 500 is shown in FIG. 3. The second side wall of the container wall 500 is not visible in FIG. 3.

FIG. 3 also shows an inner face 321 of the rear segment 320 of the part of the base support 200 forming the base sump 300, which faces the internal chamber 110 of the dishwasher 100, and an inner face 401 of the rear wall 400, which faces the internal chamber 110 of the dishwasher 100.

Figure 4:
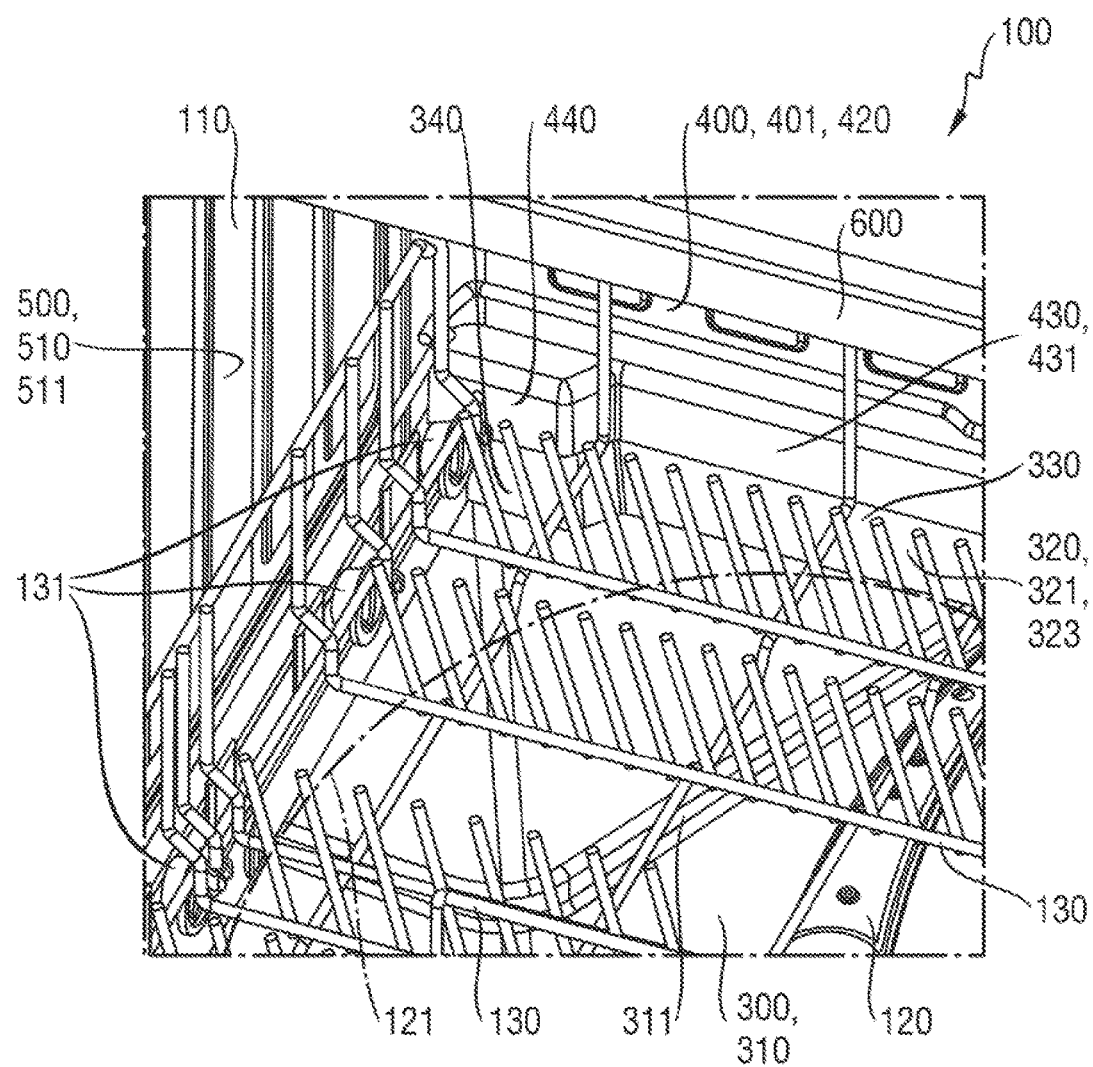
FIG. 4 shows a plan view of part of the internal chamber of the dishwasher.

FIG. 4 shows a further view of part of the internal chamber 110 of the dishwasher 100. In the view in FIG. 4 the internal chamber 110 of the dishwasher 100 is fitted with a spray arm 120 and a rack 130.

The spray arm 120 is arranged in the center of the floor region 310 of the base sump 300 and is configured to rotate about a rotation axis oriented perpendicular to the floor region 310 of the base sump 300 and arranged in the center of the floor region 310 of the base sump 300 during operation of the dishwasher 100, thereby spraying wash fluid. A rotation region 121 of the spray arm 120 is shown with a dot/dash line in FIG. 4.

The rack 130 is preferably made of wire and serves to hold dishes. The rack 130 has a plurality of rollers 131, which serve to move the rack 130 above the floor region 310 of the base sump 300.

FIG. 4 also shows the first recess 340 in the rear segment 320 of the base sump 300. The first recess 340 projects further into the internal chamber 110 of the dishwasher 100 than the center region 330 of the rear segment 320 of the base sump 300. However the first recess 340 is arranged in a corner region of the internal chamber 110 in such a manner that the first recess 340 is arranged outside the rotation region 121 covered by the spray arm 120 and also outside the region in which the rack 130 and any dishes arranged in the rack 130 are located.

Figure 5:
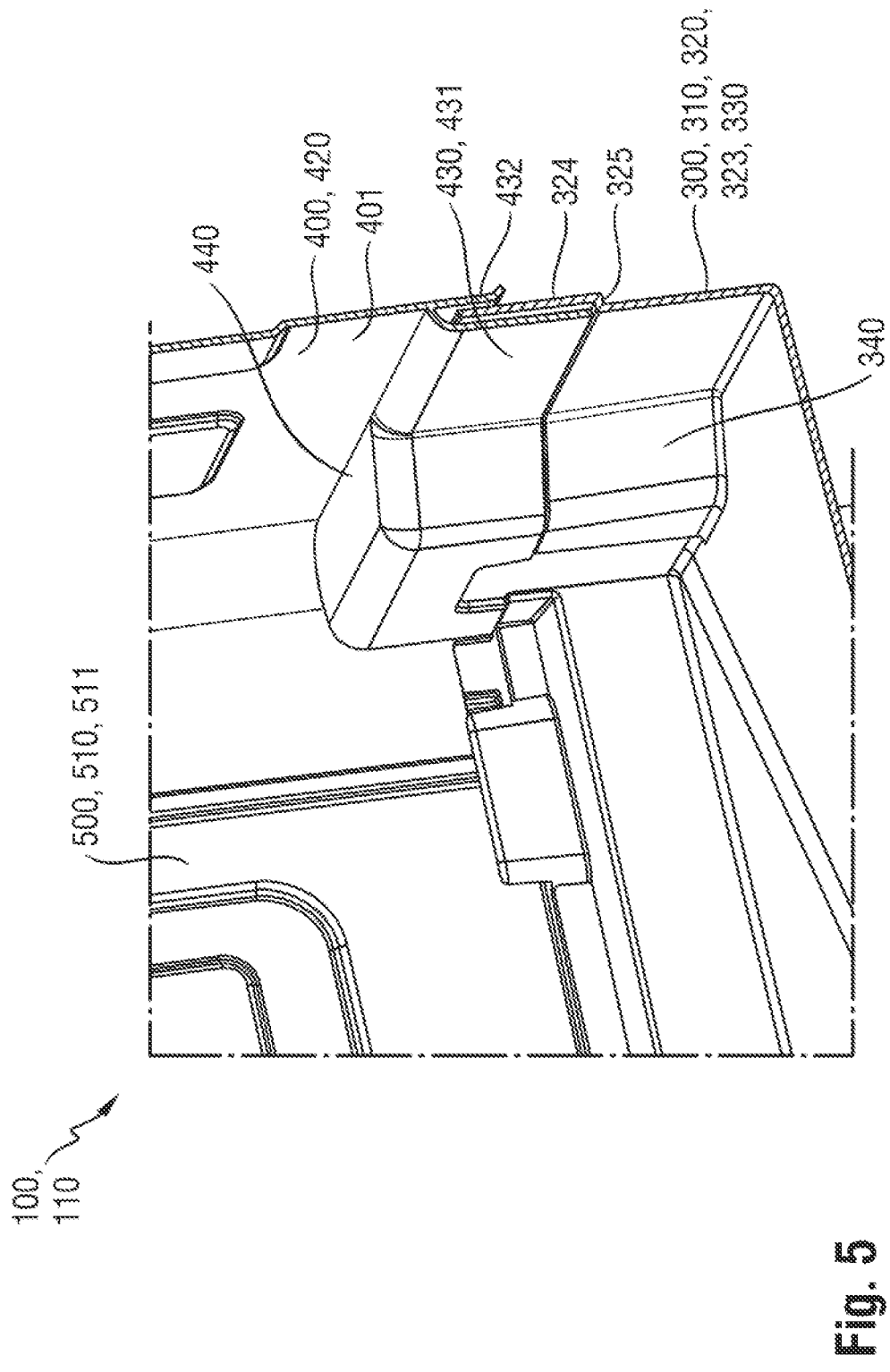
FIG. 5 shows an enlarged sectional view of part of the internal chamber of the dishwasher.

FIG. 5 shows an enlarged view of the part of the internal chamber 110 of the dishwasher 100, in which the first recess 340 in the rear segment 320 of the base sump 300 is configured. In the view in FIG. 5 the dishwasher 100 is cut through in a plane parallel to the first side wall 510. The rack 130 in the internal chamber 110 of the dishwasher 100 is not shown in FIG. 5.

In the sectional view in FIG. 5 the lower segment 323 and upper segment 324 of the center region 330 of the rear segment 320 of the base sump 300 can be clearly distinguished. The lower segment 323 and the upper segment 324 are oriented parallel to one another. However the lower segment 323 is offset to some degree in the direction of the internal chamber 110 compared with the upper segment 324. The overhang 325 is configured between the lower segment 323 and the upper segment 324. The division of the rear segment 320 into the lower segment 323 and the upper segment 324 also continues in the region of the first recess 340 and in the region of the second recess 350. The upper segment 324 is also offset to some degree in an outward direction compared with the lower segment 323 in the region of the recesses 340, 350. The overhang 325 is also configured between the upper segment 324 and the lower segment 323 in the regions of the recesses 340, 350.

It can also be seen in FIG. 5 that the rear wall 400 has an upper region 420, which is configured as essentially flat. In the vertical direction of the dishwasher 100 below the upper region 420 the rear wall 400 has a center region 430, a first cap 440 and a second cap. The second cap is not visible in FIG. 5. The center region 430 of the rear wall 400 is arranged above the center region 330 of the rear segment 320 of the base sump 300 in the vertical direction of the dishwasher 100. The first cap 440 is arranged above the first recess 340 of the base sump 300 in the vertical direction of the dishwasher 100. The second cap is arranged correspondingly above the second recess 350 of the base sump 300.

The center region 430 of the rear wall 400 has an inner apron 431 and an outer apron 432. The outer apron 432 is essentially a continuation of the upper region 420 of the rear wall 400. The inner apron 431 overlaps the upper segment 324 of the center region 330 of the rear segment 320 of the base sump 300. The inner apron 431 is therefore arranged in the internal chamber 110 of the dishwasher 100. The inner apron 431 and the outer apron 432 overlap the upper segment 324 of the center region 330 of the rear segment 320 of the base sump 300. The outer apron 432 only overlaps around half of the upper segment 324. The inner apron 431 overlaps the upper segment 324 completely and extends to the overhang 325 between the upper segment 324 and the lower segment 323 of the rear segment 320 of the base sump 300. The inner apron 431, the upper segment 324 of the rear segment 320 and the outer apron 432 are therefore arranged in the manner of a tongue and groove connection. This connection serves to seal the internal chamber 110 of the dishwasher 100 from the outside.

The first cap 440 is configured in such a manner that it covers the upper segment 324 of the first recess 340 in the rear segment 320 of the base sump 300. The first cap 440 therefore closes the first recess 340 off in a sealing manner from the internal chamber 110 of the dishwasher 100. The first cap 440 projects further into the internal chamber 110 than the upper region 420 of the rear wall 400. The second cap correspondingly covers the upper segment 324 of the second recess 350 in the rear segment 320 of the base sump 300.

If the rear wall 400 is made of plastic, the first cap 440 and second cap can advantageously be configured as particularly light.

Figure 6:
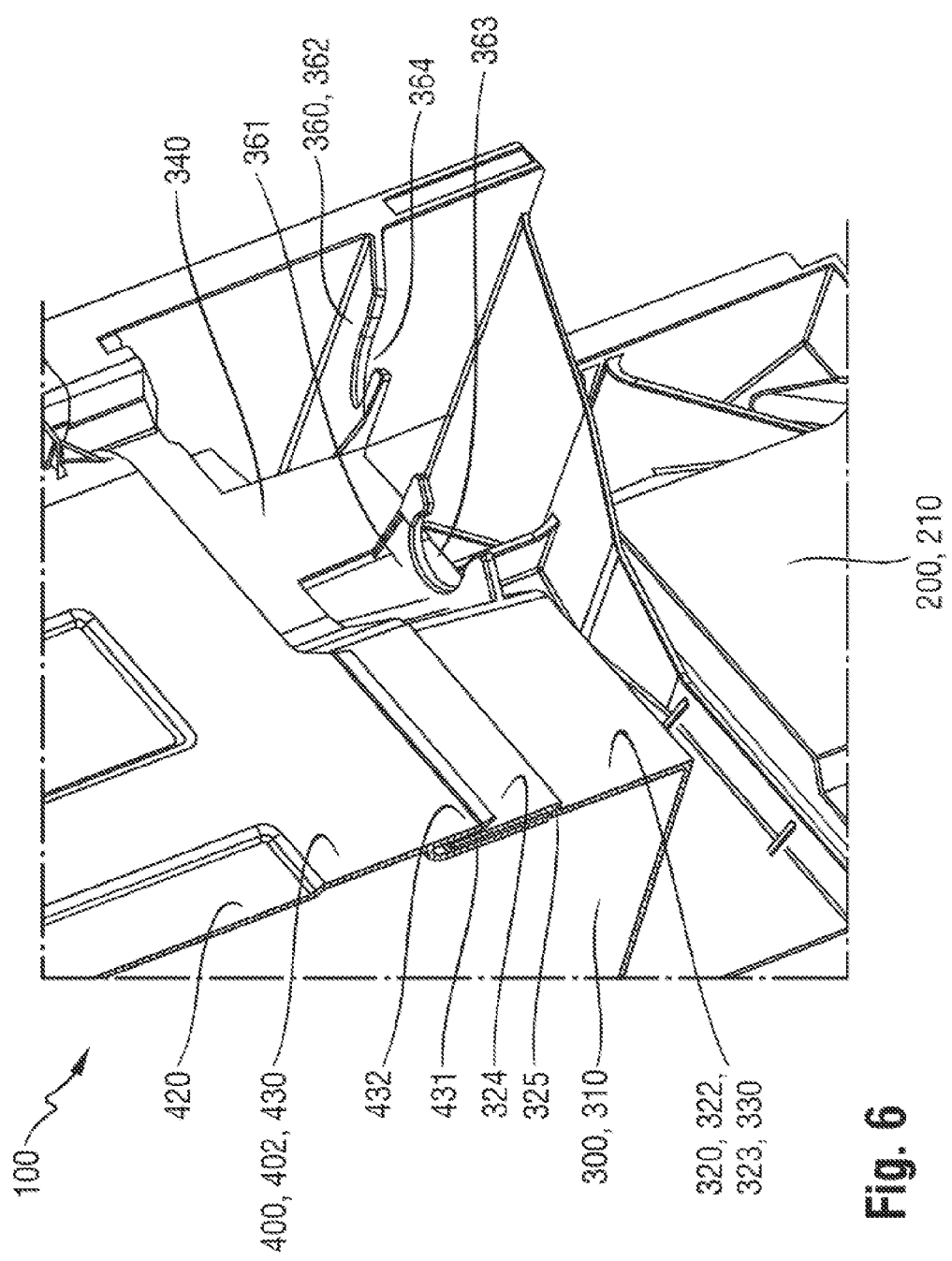
FIG. 6 shows an enlarged and sectional view of a rear part of the dishwasher.

FIG. 6 shows a sectional view of the rear wall 210 of the base support 200 and the outer face 402 of the rear wall 400 in the region around the first recess 340 in the rear segment 320 of the part of the base support 200 forming the base sump 300. The section is also oriented parallel to the first side wall 510 of the dishwasher 100 in the view in FIG. 6.

It can be seen from FIG. 6 that the first cap 440 of the rear wall 400 projecting beyond the first recess 340 on the inner face 321 of the rear segment 320 of the base sump 300 does not project beyond the first recess 340 on the outer face 322 of the rear segment 320 of the base sump 300. The first recess 340 is therefore accessible from the outside in the rear region of the dishwasher 100.

FIG. 7 shows a view of the rear part of the dishwasher 100 corresponding to the diagrams in FIG. 1. In addition to the elements of the dishwasher 100 shown in FIG. 1 FIG. 7 also shows a drain hose 140. The drain hose 140 serves to conduct wash fluid (wash liquor) from the internal chamber 110 of the dishwasher 100 to a waste water connection. The waste water connection can be for example a waste water connection in a kitchen, in which the dishwasher 100 is installed.

The drain hose 140 is connected to a drain pump arranged within the base support 200 in the interior of the dishwasher 100. A guided through segment 141 of the drain hose 140 extends from the interior of the base support 200 through the aperture 220 in the rear wall 210 of the base support 200 into the outer region outside the dishwasher 100. A free segment 142 of the drain hose 140 runs in the direction of the waste water connection (not visible in FIG. 7) in the outer region.

An upward guided segment 143 of the drain hose 140 is arranged between the guided through segment 141 of the drain hose 140 and the free segment 142 of the drain hose 140. FIG. 8 shows an enlarged detail of the upward guided segment 143 of the drain hose 140. The upward guided segment 143 forms a U-shaped part of the drain hose 140, the U shape standing on its head. The upward guided segment 143 is held in the first retaining device 360 in the first recess 340 of the rear segment 320.

A part of the upward guided segment 143 of the drain hose 140 that extends upward from the guided through segment 141 of the drain hose 140 in the vertical direction of the dishwasher 100 is clamped in the first clamping opening 363 of the first hose clip 361 of the first retaining device 360. A segment of the drain hose 140, which is curved into a U shape, adjoins the part of the drain hose 140 clamped in the first hose clip 361, followed by a part of the upward guided segment 143 of the drain hose 140 running downward in the vertical direction of the dishwasher 100. The part of the upward guided segment 143 running downward in the vertical direction of the dishwasher 100 is clamped in the second clamping opening 364 of the second hose clip 362 of the first retaining device 360. The free segment 142 of the drain hose 140 adjoins the part of the upward guided segment 143 of the drain hose 140 running downward in the vertical direction of the dishwasher 100.

The upward guided segment 143 of the drain hose 140 forms an upward hose guide, which prevents wash fluid in the internal chamber 110 of the dishwasher 100 running unintentionally out of the dishwasher 100. To this end the apex of the upward guided segment 143 of the drain hose 140 is higher than a maximum fluid level of a wash fluid in the internal chamber 110 of the dishwasher 100 in the vertical direction of the dishwasher 100.

As the upward hose guide is integrated directly into the drain hose 140 by means of the upward guided segment 143 of the drain hose 140, no further components are advantageously needed to prevent the wash fluid running inadvertently out of the internal chamber 110 of the dishwasher 100. This advantageously also means that no further fitting steps are required when fitting the dishwasher 100. The drain hose 140 can be connected directly to an outlet of a drain pump of the dishwasher 100. It also advantageously means that no additional sealing points are required.

The upward guided segment 143 of the drain hose 140 held by the first retaining device 360 is advantageously arranged in the first recess 340 and thus protected. This avoids the upward guided segment 143 being inadvertently pulled out of the first retaining device 360. In one simplified embodiment of the dishwasher the first recess 340 can however also be dispensed with. In this embodiment the first retaining device 360 is arranged in a region of the rear wall of the dishwasher 100 which is not set back compared with other segments of the rear wall of the dishwasher 100.

The upward guided segment 143 of the drain hose 140 can advantageously be clamped into the first retaining device 360 by a user of the dishwasher 100. This advantageously reduces the fitting costs incurred when producing the dishwasher 100.

If, in a domestic situation in which the dishwasher 100 is installed, a siphon is arranged high enough up on a waste water connection to prevent wash fluid running inadvertently out of the internal chamber 110 of the dishwasher 100, it is possible to dispense with the upward hose guide formed by the upward guided segment 143 of the drain hose 140. The upward guided segment 143 of the drain hose 140 can then be removed from the first retaining device 360, thereby lengthening the part of the drain hose 140 that can be used for connection to the waste water connection. This advantageously allows a larger distance to be bridged between the dishwasher 100 and the domestic waste water connection with the same length of drain hose 140.

Because the first retaining device 360 is configured as a single piece with the base sump 300 and the other parts of the base support 200, no further auxiliary parts are advantageously required to hold the upward guided segment 143 of the drain hose 140. This reduces the production costs of the dishwasher 100.

By guiding the upward guided segment 143 of the drain hose 140 and fastening the upward guided segment 143 of the drain hose 140 in the first retaining device 360 the drain hose 140 is guided in a defined manner in the direction of the first side wall 510 of the dishwasher 100. This reduces the risk of loose segments of the drain hose 140 kinking behind the dishwasher 100.

The arrangement shown in FIGS. 7 and 8, in which the upward guided segment 143 of the drain hose 140 is held in the first retaining device 360, is suitable for situations in which the dishwasher 100 is installed in such a manner that the waste water connection is in the same direction as the first retaining device 360, when viewed from the aperture 220 in the rear wall 210 of the base support 200. However if the dishwasher 100 is installed in such a manner that the waste water connection is arranged in the opposite direction, in other words in the same direction as the second retaining device 370, when viewed from the aperture 220, the upward guided segment 143 of the drain hose 140 can be held in the second retaining device 370. The first retaining device 360 is then free. This advantageously allows the option of changing to reach waste water connections that are further away with the same length of drain hose 140. Because the drain hose 140 can be guided immediately in the direction of the waste water connection from its guided through segment 141 running through the aperture 220, the risk of segments of the drain hose 140 becoming entangled or kinking behind the dishwasher 100 is also reduced.

With the dishwasher 100 the space previously used to bring about a through guide for the hose can be used for other functions in contrast to conventional dishwashers. For example additional fleece insulation can be provided in the region previously used for the upward hose guide within the dishwasher 100.

Instead of the drain hose 140 an inlet hose for the dishwasher 100 could also be held in the retaining devices 360, 370. An inlet hose could also be held in one retaining device 360, 370 and the drain hose 140 could be held in the other retaining device 360, 370.

The configurations and developments of the invention described above and/or set out in the dependent claims can be used individually or in any combination with one another, except in instances of obvious dependency or incompatibility.

The invention claimed is:

1. A water-conducting domestic appliance, comprising:
an outer wall which defines an exposed exterior surface of the domestic appliance;
a hose; and
a first retaining device arranged on the exposed exterior surface of the outer wall of the domestic appliance and configured to hold the hose against the exposed exterior surface of the outer wall during operation of the domestic appliance,
wherein the outer wall has an aperture which opens to the exposed exterior surface and through which the hose is guided, said first retaining device being arranged above the aperture,
wherein the first retaining device comprises a first hose clip and a second hose clip, the first hose clip and the second hose clip being configured as a single piece with the outer wall,
wherein the second hose clip is tilted at an angle with respect to the first hose clip,
wherein the tilt of the second hose clip in relation to the first hose clip is oriented in such a manner that a side of the second hose clip facing the first hose clip is higher than a side of the second hose clip facing a first side wall of the domestic appliance in a vertical direction of the domestic appliance, and
wherein the first hose clip and the second hose clip are configured and arranged to hold respective segments of the hose running in an inverted U shape.

2. The domestic appliance of claim 1, constructed in the form of a domestic dishwasher.

3. The domestic appliance of claim 1, wherein the hose is a drain hose.

4. The domestic appliance of claim 1, wherein the outer wall is a rear outer wall of the domestic appliance.

5. The domestic appliance of claim 1, further comprising a base sump, said first retaining device being configured in one piece with the base sump.

6. The domestic appliance of claim 1, further comprising a base support, said first retaining device being configured in one piece with the base support.

7. The domestic appliance of claim 1, wherein the outer wall has a first recess, said first retaining device being arranged in a region of the first recess of the outer wall, said outer wall being recessed in a direction of an internal chamber of the domestic appliance in the region of the first recess.

8. The domestic appliance of claim 1, further comprising a second retaining device configured to hold the hose against the outer wall during operation of the domestic appliance.

9. The domestic appliance of claim 8, wherein the outer wall has a second recess, said second retaining device being arranged in a region of the second recess of the outer wall, said outer wall being recessed in a direction of an internal chamber of the domestic appliance in the region of the second recess.

10. The domestic appliance of claim 8, wherein the second retaining device is configured and arranged with symmetry in relation to the first retaining device.

11. A water-conducting domestic appliance, comprising:
an outer wall which defines an exposed exterior surface of the domestic appliance;
a hose; and
a first retaining device arranged on the exposed exterior surface of the outer wall of the domestic appliance and configured to hold the hose against the exposed exterior surface of the outer wall during operation of the domestic appliance,
wherein the outer wall has an aperture which opens to the exposed exterior surface and through which the hose is guided, said first retaining device being arranged above the aperture,
wherein the first retaining device comprises a first hose clip and a second hose clip, the first hose clip and the second hose clip being configured as a single piece with the outer wall,
wherein the first hose clip is arranged in a plane and runs out at a downward angle, and
wherein a plane in which the second hose clip is arranged is tilted at an angle of around 45° to the plane in which the first hose clip is arranged.

12. A water-conducting domestic appliance, comprising:
an outer wall which defines an exposed exterior surface of the domestic appliance, said exposed exterior surface having a first recess and a second recess;
a hose;

a first retaining device arranged in the first recess on the exposed exterior surface of the outer wall of the domestic appliance and configured to hold the hose against the exposed exterior surface of the outer wall during operation of the domestic appliance, wherein the first retaining device comprises a first hose clip and a second hose clip; and a second retaining device arranged in the second recess on the exposed exterior surface of the outer wall of the domestic appliance and configured to hold the hose against the exposed exterior surface of the outer wall during operation of the domestic appliance, wherein the second retaining device comprises a third hose clip and a fourth hose clip.

13. The domestic appliance of claim 12, wherein the second retaining device is configured and arranged with symmetry in relation to the first retaining device.

14. The domestic appliance of claim 12, wherein the outer wall is a rear outer wall of the domestic appliance, and wherein the first recess is disposed adjacent to a first side wall of the domestic appliance and the second recess is disposed adjacent to a second side wall of the domestic appliance.

\* \* \* \* \*